April 18, 1933.   A. C. HARDY   1,904,449
SOUND RECORD FILM AND FILM PRINTING APPARATUS
Filed May 20, 1927
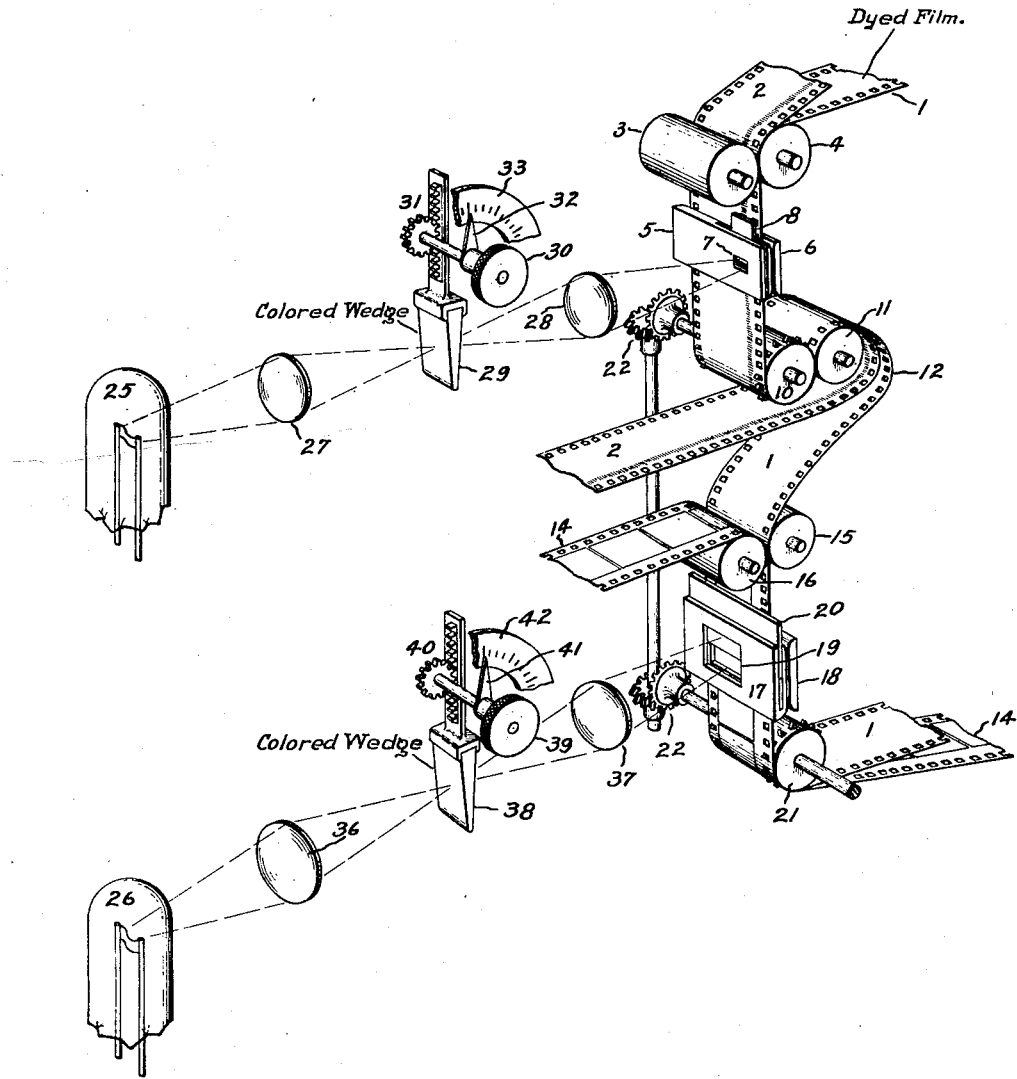
Inventor
Arthur C. Hardy
by *Alexander S. Lewis*
His Attorney.

Patented Apr. 18, 1933

1,904,449

UNITED STATES PATENT OFFICE

ARTHUR C. HARDY, OF WELLESLEY, MASSACHUSETTS, ASSIGNOR TO GENERAL ELECTRIC COMPANY, A CORPORATION OF NEW YORK

SOUND RECORD FILM AND FILM PRINTING APPARATUS

Application filed May 20, 1927. Serial No. 193,017.

My invention relates to sound record films and to the printing of sound record and picture films by which the records on a plurality of separate films are combined on a single film. The latter aspect of my invention relates particularly to the printing of films bearing moving picture and accompanying sound records adapted for the production of so-called "talking motion pictures". In the present state of the art it is in some cases preferable for various reasons to make the original picture and sound records on separate films and subsequently to combine those records on a single film from which the reproduced pictures and sounds may be made by the use of appropriate apparatus. It is well known to those skilled in the art that for the best results the films should be developed to a definite and proper gamma, however the many factors that affect the development of a film such, for example, as the temperature and concentration of the developer, the speed of the films therethrough, etc. make it very difficult in the commercial production of films to attain this ideal development. In the case where original picture and sound records are made on two separate films and are printed on a single film for reproduction, unless both original record films are developed to the proper gamma it has heretofore been necessary in general to sacrifice quality in either the sound or the picture record on the print. For example, it may be desired in a print of a combined picture and sound record to develop the print of the picture record for a high degree of contrast or to what is known as a high gamma, as in the case where the picture negative is deficient in contrast, whereas for the best results in the sound reproduction it may be that the sound record should be developed to a gamma of unity or for moderate contrast. With methods of printing prior to my invention it is not possible to obtain different values of gamma on two adjacent portions of the print film since they both must necessarily be subjected to the same treatment in the developer.

One object of my invention is to provide an improved photographic sound record film having a relatively high resolving power. Another object of my invention is to provide an improved method and means for making prints from each of a plurality of record films whereby quality in any record is not necessarily sacrificed and greater perfection is attainable without necessitating skillful manipulation.

In carrying out my invention I employ for making the print a film containing a light restraining dye. This confines the image substantially to the surface of the emulsion and makes the gamma which results on development to the limit dependent upon the color of the exposing light. In the case of a material of ordinary sensitivity confined to the blue region I prefer to use a yellow dye to absorb the blue rays. In making the print I employ separate light beams for printing the separate records thereon and I color the respective light beams so that the product of the gamma of each record film and the gamma-infinity of the print shall approximately equal a desired quantity which for example may be unity.

My invention will be better understood from the following description taken in connection with the accompanying drawing, and its scope will be pointed out in the appended claims.

In the single figure of the drawing I have shown by way of example one embodiment of apparatus by means of which my invention may be carried out.

Referring to the drawing I have shown the dyed print film at 1 and the sound record film at 2, the latter having a marginal sound record thereon and both films having the usual sprocket tooth openings therein. The two films are arranged to be drawn simultaneously from suitable reels, not shown, between the rollers 3 and 4 and then on between the guides 5 and 6, the former film being behind the latter. The front guide 5 is provided with a suitable opening 7 through which light is admitted to the marginal portion only of the films for printing the sound record, the width of the opening being adjustably controlled by the gate 8. From the guides 5 and 6 the two films 1 and 2 are arranged to pass on to the sprocket wheel 10 and over the roller 11 from which the sound record film 2 passes off to a suitable receiving reel, not shown.

The print film 1 upon leaving roller 11 forms the loop 12 and then is drawn with the picture record film 14 between the rollers 15 and 16 passing down in contact with each other between the guides 17 and 18. Front guide 17 is provided with a suitable opening 19 through which light is admitted to the central or main portion only of the films for printing the picture record. The width of the opening is adjustably controlled by the gate 20. From the guides 17 and 18 the films 1 and 14 pass over the sprocket wheel 21 and then on to suitable receiving reels, not shown. It will be understood that where the films pass through the guides they are held in close contact with each other with the emulsion sides adjacent. The two sprocket wheels 10 and 21 are shown connected together by gearing 22 and are adapted to be driven at uniform and equal speeds by means not shown. If desired, the films 1 and 14 may be given an intermittent movement through the guides 17 and 18 by the use of suitable well known mechanism and each separate picture printed while the films remain stationary.

For supply light for printing the two records I have shown for convenience two separate light sources 25 and 26. Light from source 25 is collected by the lens 27 and focused by a second lens 28 on the opening 7 in guide 5. At the focal point between the two lenses the light beam is caused to pass through the color screen 29 which is shown wedge-shaped whereby its color value or effect on the beam may be varied readily by moving it up or down. To facilitate the movement of the screen 29 and the setting of the same at any predetermined position I have shown the thumb screw 30 connected with the screen through the rack and pinion gearing 31 and having the pointer 32 movable over the scale 33. Similar apparatus is provided for directing the light beam by which the picture record is printed and for controlling the color thereof. As before, light from the source 26 is collected by the lens 36 and focused on the picture printing opening 19 by the lens 37, the beam being passed through the wedge-shaped color screen 38 controlled by the thumb screw 39 through gearing 40 and the position of the screen being indicated by the pointer 41 on the scale 42.

Before making a print in accordance with my invention combining on a single film the picture and sound records which are on the separate picture and sound films, I determine the gamma of each of the picture and sound films. Knowing the gamma-infinity of the dyed film for various colors or shades of color of the exposing light, I so adjust the position of the color screen wedge 29 that when the print is developed to the limit the product of the gamma of the sound record film and the gamma of the print shall approximately equal unity. Likewise I adjust the color screen wedge 38 so that the product of the gamma of the picture record film and the gamma-infinity of the print film shall also approximately equal unity or any other desired value. Inasmuch as the light transmission of the finished print film is a function of the product of the gamma of the record film and the gamma-infinity of the dyed print film according to the formula $$T_2 = K(E)^{r_1 r_2}$$

where $T_2$ is the transmission of the print film; $K$ is a constant depending upon the printing light and time; $E$ is the exposure of the record film; $r_1$ and $r_2$ are respectively the gamma of the record film and the gamma-infinity of the print film, it will be seen that when the product of the two gammas equals unity the transmission of the print film is proportional to the first power of the exposure of the record film.

It will be understood that various means may be provided for producing the desired color of the light used in printing, the adjustable wedge-shaped screens being shown merely as illustrative of one such means. With such means for example, the gamma-infinity of the dyed print film may be varied from about 0.8 to about 1.3 which range under ordinary circumstances will provide ample control. In making film prints of motion picture and sound records there are important advantages from a photographic standpoint that accrue from being able to carry the development of the film to the limit. Not only is the dark room technique simplified and made more certain but the resulting record, particularly the sound record, is greatly improved as a result of the elimination of the local restraining action of free bromide formed by the reduction of silver bromide to silver in the heavily exposed portions. Although the dyed film is somewhat less rapid by reason of the presence of the light-restraining dye than those ordinarily used for negatives or for positives the dye finally may be washed out so as not to interfere with the transmission of light therethrough in the sound reproducer and picture projector.

Because of its high resolving power I may use dyed film for making the original sound record negative. Notwithstanding the decreased speed of the dyed film over the undyed film, sufficient light for making the sound record may be obtained since this process is not dependent upon daylight as is usually the case, for example, in motion picture photography. The higher resolving power provided by the dyed film resulting in greater detail in the recorded image is particularly advantageous for recording the high frequencies of the sound which on ordinary films may largely be lost.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. The method of making a film print from a plurality of separate sound and picture record films which comprises exposing separate portions of a print film containing a light restraining dye to separate light beams, forming sharp images thereon, controlling the beams by the respective record films and independently adjustably coloring the respective beams whereby the products of the gamma of each record film and the gamma of the print film shall have predetermined values when the print film is developed to the limit.

2. Apparatus for making a contact print on film containing a light restraining dye of separate sound and picture records comprising means for producing a plurality of light beams, means for passing the dyed film and the sound record film contiguous therewith through one of said beams, means for passing the dyed film and the picture record film contiguous therewith through another of said beams, a colored wedge in each of said beams and means for adjusting the wedges whereby upon development of the print to the limit the sound and picture records thereof may be caused to have predetermined gammas.

3. The method of making a combined print of the sound and picture records contained on separate sound and picture films which comprises exposing separate portions of a print film containing a light restraining dye to light beams controlled respectively by said sound and picture records, independently coloring each of said beams in accordance with the gamma of the original record which it prints and the desired gamma of the print thereof, and developing the combined print to the limit.

4. Film printing apparatus comprising means for movably supporting a print film containing a light restraining dye in printing relation with a sound record film and a picture record film, means for producing a plurality of light beams, means for exposing different portions of said print film to the respective light beams under the control of the respective sound and picture films, and means for giving to each of said light beams a predetermined color such that the different portions of said print film each shall have a gamma-infinity of a predetermined value.

5. Apparatus for printing on adjacent portions of a sensitive film containing a light restraining dye the respective sound and picture records from a plurality of sound and picture films which comprises means for producing a plurality of exposing light beams, means for passing portions of the sensitive film and the sound film through one of said beams, means for passing portions of the sensitive film and the picture film through another of said beams, means for giving to each beam a predetermined color determined respectively by the gamma of the original record and the desired gamma of the corresponding printed portion of the print film.

6. Apparatus for printing on adjacent longitudinal portions of a sensitive film containing a light restraining dye the respective sound and picture records from a plurality of sound and picture films which comprises means for producing a plurality of exposing light beams, means for passing a portion of the sensitive film and the sound film through one of said beams, means for passing a portion of the sensitive film and the picture film through another of said beams, a color wedge arranged in each of said beams, and means for adjusting the position of each of said wedges whereby the print film may be developed to the limit and the adjacent sound and picture records may be caused to have the respective gammas which are best suited to the reproduction of each.

7. The method of making operative records from master photographic sound and picture records that comprises light printing images from said master records upon a single film sensitized predominantly to light of certain wave lengths and carrying in the sensitized emulsion a removable dye absorptive of light of said wave lengths, the color of the printing light for the sound and picture records being independently adjusted and controlled in accordance with the desired contrast of the operative records and developing said light printed images into operative records.

In witness whereof, I have hereunto set my hand this 19th day of May, 1927.

ARTHUR C. HARDY.